United States Patent
Millen, II et al.

(10) Patent No.: US 8,515,798 B2
(45) Date of Patent: Aug. 20, 2013

(54) CLOSED-LOOP SUPPLY CHAIN IN THE PAPER PACKAGING SECTOR

(75) Inventors: Jonathan A. Millen, II, Miami, FL (US); Luke Leslie, London (GB); Paul Sheridan, East Sussex (GB)

(73) Assignee: Accenture Global Services GmbH, Schaffhausen (CH)

( * ) Notice: Subject to any disclaimer, the term of this patent is extended or adjusted under 35 U.S.C. 154(b) by 1224 days.

(21) Appl. No.: 11/533,148

(22) Filed: Sep. 19, 2006

(65) Prior Publication Data

US 2007/0073571 A1 Mar. 29, 2007

Related U.S. Application Data

(60) Provisional application No. 60/721,333, filed on Sep. 27, 2005.

(51) Int. Cl.
*B65D 37/00* (2006.01)

(52) U.S. Cl.
USPC .......................................... 705/7.27; 229/800

(58) Field of Classification Search
USPC ......................................................... 229/942
See application file for complete search history.

(56) References Cited

U.S. PATENT DOCUMENTS

| | | | | |
|---|---|---|---|---|
| 3,767,524 | A * | 10/1973 | Gleason | 162/8 |
| 5,829,229 | A * | 11/1998 | Hyatt et al. | 53/445 |
| 2004/0054603 | A1* | 3/2004 | Clinesmith et al. | 705/26 |
| 2004/0069850 | A1* | 4/2004 | De Wilde | 235/385 |
| 2005/0219039 | A1* | 10/2005 | Allen | 340/10.2 |
| 2005/0236479 | A1* | 10/2005 | Schmidtberg et al. | 235/384 |

OTHER PUBLICATIONS

Earth Answers, How is Paper Recycled? 2001.*
State of Washington Department of Ecology, Special Reporting Requirements http://web.archive.org/web/20060222084239/http://www.ecy.wa.gov/programs/hwtr/waste-report/recycling_credit.htm.*
Endless Harvest of Savings /Recycling Innovation Earns Steilacoom Paper Mill Awards, Renown Graham Fysh, The News Tribune. Tacoma, Wash.: Jun. 22, 1999. p. D.1.*
Macpherson takes wraps off company waste exchange; [2 Edition] Harry Conroy. The Herald. Glasgow (UK): Nov. 14, 1998. p. 24.*
FSC: Forest Stewardship Council Certification Michael P Washburn, Katie J Miller. Journal of Forestry. Bethesda: Dec. 2003. vol. 101, Iss. 8; p. 8.*

* cited by examiner

*Primary Examiner* — William Rankins

(57) ABSTRACT

Apparatuses and methods for providing a closed loop supply chain in a paper packaging business sector. A closed loop supply chain, as provided by a paper packaging company, includes collecting paper packaging waste from a retailer, producing paper material from the paper packaging waste, converting the paper material into packaging material, providing the packaging material to a product manufacturing company, and assisting the product manufacturing company in packaging a manufactured product. The paper packaging company may transport the manufactured product from the product manufacturing company to the retailer, obtain timber harvest, and produce paper material from the timber harvest and the paper packaging waste. Paper-packaging material is monitored as the paper-packaging material moves with a closed-loop supply chain. A collection and analyzing site collects data from a plurality of monitoring sites that are located at specified locations within the closed-loop supply chain in order to track the paper packaging material.

7 Claims, 8 Drawing Sheets

CLOSED-LOOP SUPPLY CHAIN IN THE PAPER PACKAGING SECTOR

This application claims priority to provisional U.S. Application No. 60/721,333 ("The Paper Packaging Materials Closed-Loop"), filed Sep. 27, 2005.

FIELD OF THE INVENTION

This invention relates generally to a paper packaging company. More particularly, the invention provides methods and systems for providing a closed-loop supply chain.

BACKGROUND OF THE INVENTION

For paper packaging companies, the pursuit of sustainable, profitable growth has become a significant challenge. In particular, the increasing commoditization of products and services has exerted pressure on prices. At the same time, cost reductions that are driven through efficient and effective processes have become the norm in the industry—leaving relatively little room for improvement on that front. For many paper packaging companies, the result has been stagnant and declining operating margins, which in turn has contributed to the paper packaging sector's substantial loss of value over the last five years as illustrated by FIG. 1. Relationship 10 shows a weighted average share price for paper packaging companies. Relationship 20 shows an operating margin for the paper packaging industry.

There exists a need in the art for systems and methods that support additional streams of revenue for a paper packaging company to increase the profitability to the owner.

BRIEF SUMMARY OF THE INVENTION

Embodiments of invention provide apparatuses, computer media, and methods for providing a closed-loop supply chain in a paper packaging business sector.

With one aspect of the invention, a closed loop supply chain, as provided by a paper packaging company, includes collecting paper packaging waste from a retailer, producing paper material from the paper packaging waste, converting the paper material into packaging material, providing the packaging material to a product manufacturing company, and assisting the product manufacturing company in packaging a manufactured product.

With another aspect of the invention, a paper packaging company transports the manufactured product from the product manufacturing company to the retailer.

With another aspect of the invention, the paper packaging company obtains timber harvest and produces paper material from the timber harvest and the paper packaging waste.

With another aspect of the invention, paper-packaging material is monitored as the paper-packaging material moves with a closed-loop supply chain. A collection and analyzing site collects data from a plurality of monitoring sites that are located at specified locations within the closed-loop supply chain. A monitoring site obtains an identification of the paper packaging material, e.g., from an Radio Frequency Identification (RFID) tag that is attached to the paper packaging material, and may additionally obtain measurements of environmental factors. The obtained data is subsequently sent to the collection and analyzing site so that the paper packaging material can be tracked.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 1:
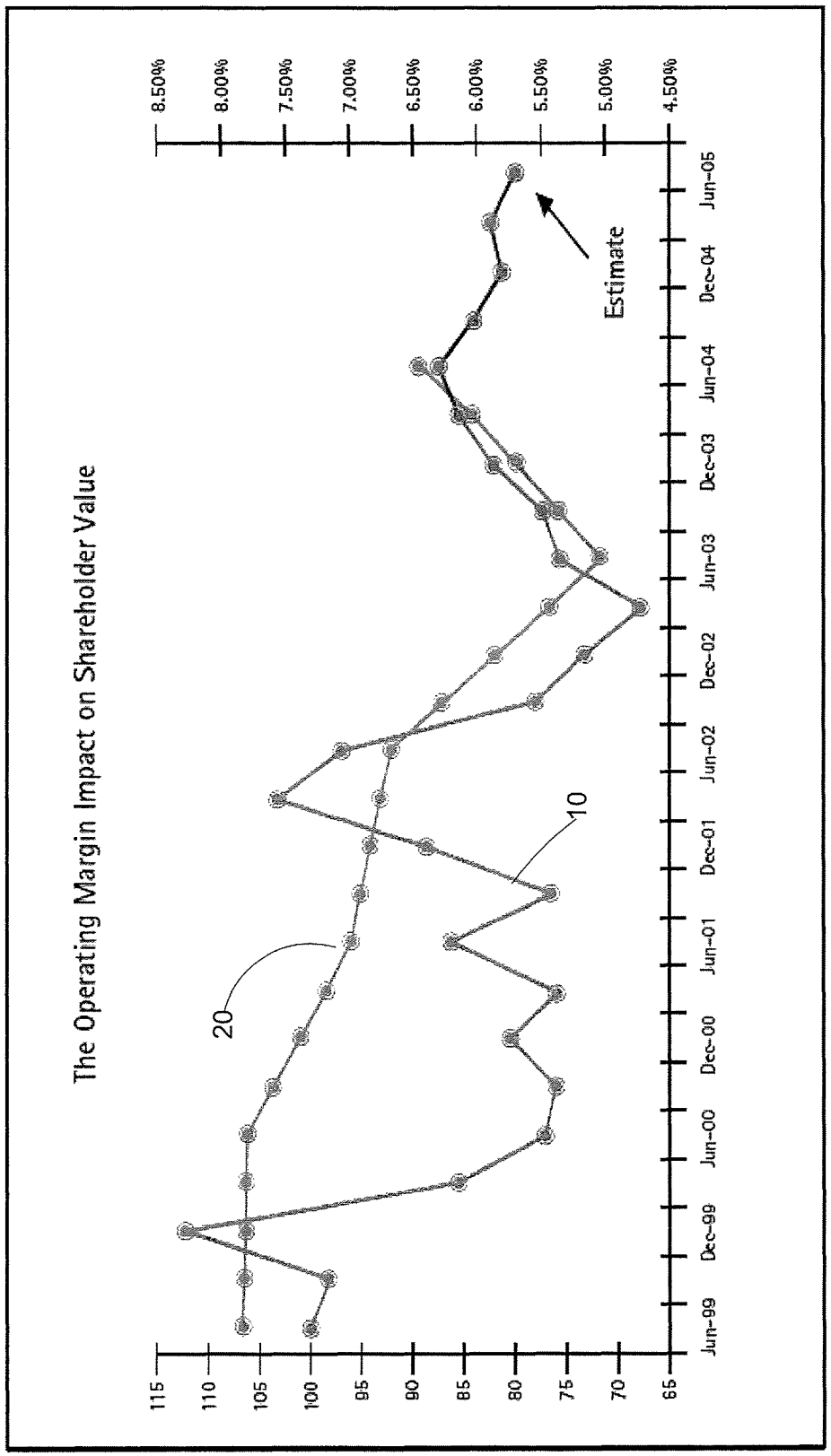
FIG. 1 shows economic indicators for the paper packaging industry in accordance with prior art.
Figure 2:
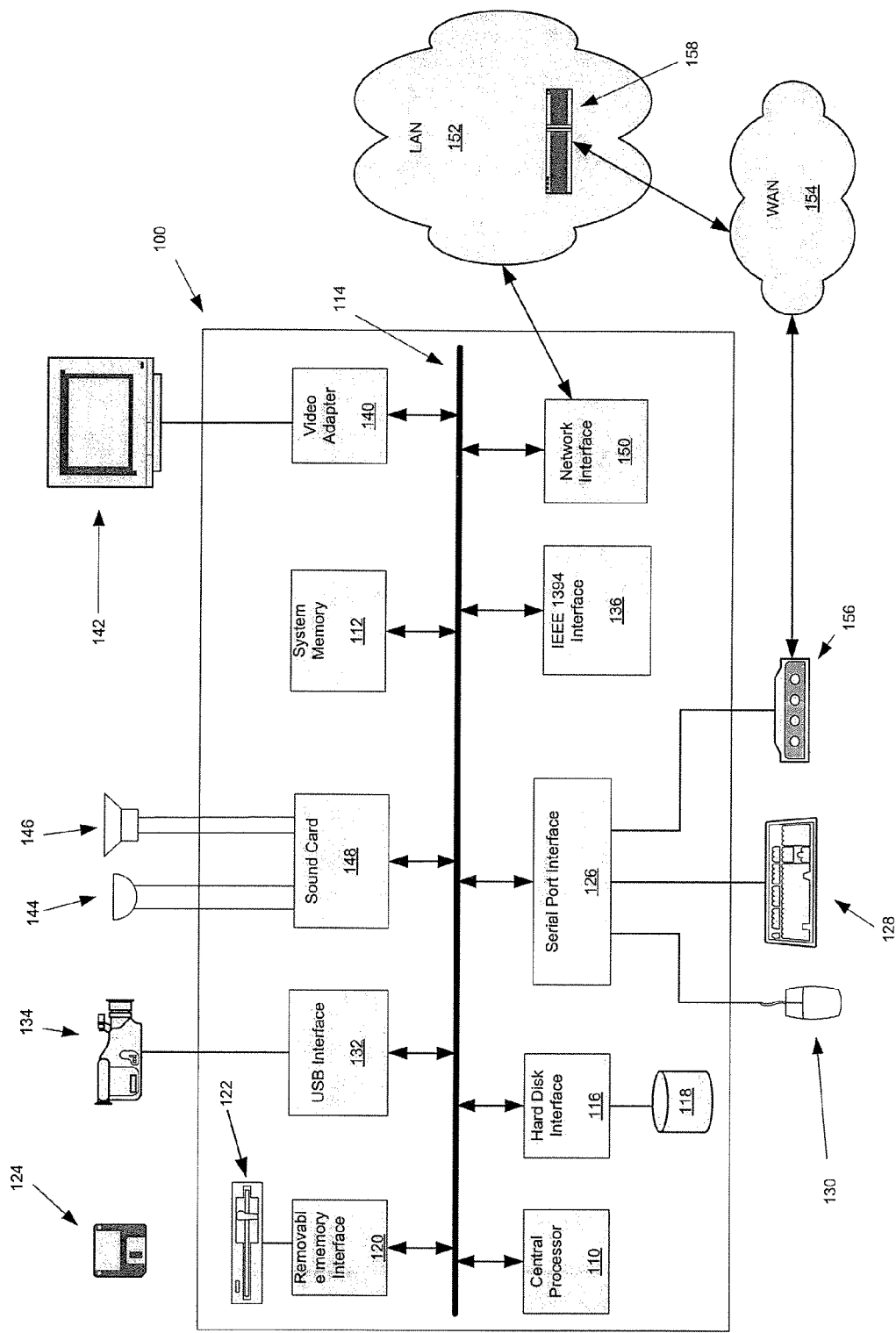
FIG. 2 shows a computer system that supports an embodiment of the invention.

FIG. 2 shows computer system 100 that supports an embodiment of the invention. Elements of the present invention may be implemented with computer systems, such as the system 100 shown in FIG. 2. (System 100 may support apparatus 700 as will be discussed.) Computer 100 includes a central processor 110, a system memory 112 and a system bus 114 that couples various system components including the system memory 112 to the central processor unit 110. System bus 114 may be any of several types of bus structures including a memory bus or memory controller, a peripheral bus, and a local bus using any of a variety of bus architectures. The structure of system memory 112 is well known to those skilled in the art and may include a basic input/output system (BIOS) stored in a read only memory (ROM) and one or more program modules such as operating systems, application programs and program data stored in random access memory (RAM).

Computer 100 may also include a variety of interface units and drives for reading and writing data. In particular, computer 100 includes a hard disk interface 116 and a removable memory interface 120 respectively coupling a hard disk drive 118 and a removable memory drive 122 to system bus 114. Examples of removable memory drives include magnetic disk drives and optical disk drives. The drives and their associated computer-readable media, such as a floppy disk 124 provide nonvolatile storage of computer readable instructions, data structures, program modules and other data for computer 100. A single hard disk drive 118 and a single removable memory drive 122 are shown for illustration purposes only and with the understanding that computer 100 may include several of such drives. Furthermore, computer 100 may include drives for interfacing with other types of computer readable media.

A user can interact with computer 100 with a variety of input devices. FIG. 2 shows a serial port interface 126 coupling a keyboard 128 and a pointing device 130 to system bus 114. Pointing device 128 may be implemented with a mouse, track ball, pen device, or similar device. Of course one or more other input devices (not shown) such as a joystick, game pad, satellite dish, scanner, touch sensitive screen or the like may be connected to computer 100.

Computer 100 may include additional interfaces for connecting devices to system bus 114. FIG. 2 shows a universal serial bus (USB) interface 132 coupling a video or digital camera 134 to system bus 114. An IEEE 1394 interface 136 may be used to couple additional devices to computer 100.

Furthermore, interface 136 may configured to operate with particular manufacture interfaces such as FireWire developed by Apple Computer and i.Link developed by Sony. Input devices may also be coupled to system bus 114 through a parallel port, a game port, a PCI board or any other interface used to couple and input device to a computer.

Computer 100 also includes a video adapter 140 coupling a display device 142 to system bus 114. Display device 142 may include a cathode ray tube (CRT), liquid crystal display (LCD), field emission display (FED), plasma display or any other device that produces an image that is viewable by the user. Additional output devices, such as a printing device (not shown), may be connected to computer 100.

Sound can be recorded and reproduced with a microphone 144 and a speaker 166. A sound card 148 may be used to couple microphone 144 and speaker 146 to system bus 114. One skilled in the art will appreciate that the device connections shown in FIG. 2 are for illustration purposes only and that several of the peripheral devices could be coupled to system bus 114 via alternative interfaces. For example, video camera 134 could be connected to IEEE 1394 interface 136 and pointing device 130 could be connected to USB interface 132.

Computer 100 can operate in a networked environment using logical connections to one or more remote computers or other devices, such as a server, a router, a network personal computer, a peer device or other common network node, a wireless telephone or wireless personal digital assistant. Computer 100 includes a network interface 150 that couples system bus 114 to a local area network (LAN) 152. Networking environments are commonplace in offices, enterprise-wide computer networks and home computer systems.

A wide area network (WAN) 154, such as the Internet, can also be accessed by computer 100. FIG. 2 shows a modem unit 156 connected to serial port interface 126 and to WAN 154. Modem unit 156 may be located within or external to computer 100 and may be any type of conventional modem such as a cable modem or a satellite modem. LAN 152 may also be used to connect to WAN 154. FIG. 2 shows a router 158 that may connect LAN 152 to WAN 154 in a conventional manner.

It will be appreciated that the network connections shown are exemplary and other ways of establishing a communications link between the computers can be used. The existence of any of various well-known protocols, such as TCP/IP, Frame Relay, Ethernet, FTP, HTTP and the like, is presumed, and computer 100 can be operated in a client-server configuration to permit a user to retrieve web pages from a web-based server. Furthermore, any of various conventional web browsers can be used to display and manipulate data on web pages.

The operation of computer 100 can be controlled by a variety of different program modules. Examples of program modules are routines, programs, objects, components, and data structures that perform particular tasks or implement particular abstract data types. The present invention may also be practiced with other computer system configurations, including hand-held devices, multiprocessor systems, microprocessor-based or programmable consumer electronics, network PCS, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

Figure 3:
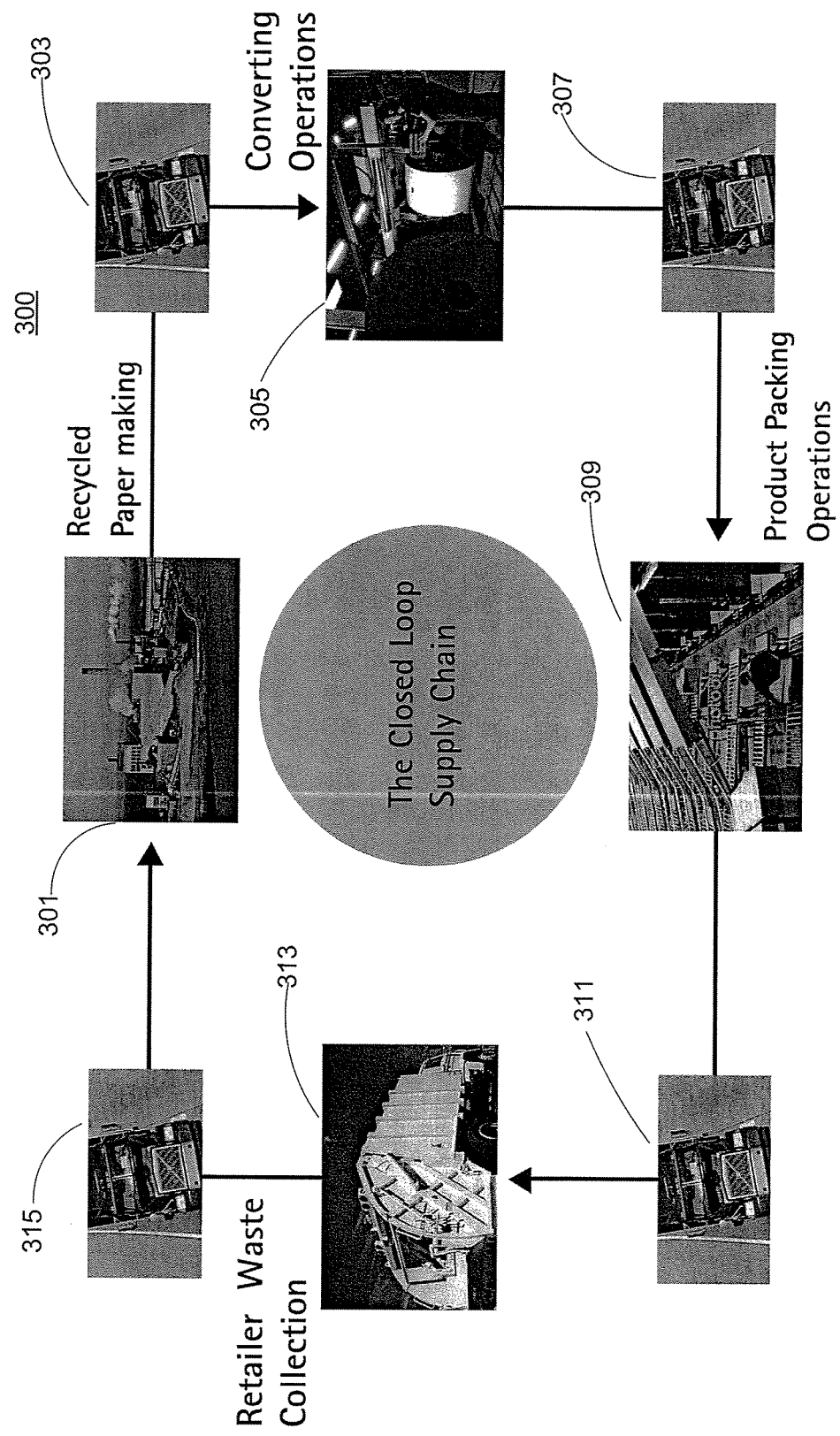
FIG. 3 shows a closed loop supply chain in accordance with an embodiment of the invention.

FIG. 3 shows a closed loop supply chain 300 in accordance with an embodiment of the invention. A closed loop supply chain spans material from timber and paper waste to pulp to paper to packaging material to paper waste in order to complete the supply chain to form a closed loop. Paper packaging-related material is any material associated with the closed loop supply chain, including paper packaging waste, timber, pulp, paper, and packaging material.

Papermaking process 401 produces paper material from paper packaging waste and from timber harvest 417. Converting process 405 converts the paper material into packaging material. With manufacturing process 409, a paper packaging company provides the packaging material to a product manufacturing company and assists the product manufacturing company in packaging a manufactured product. With retailing process 413, the paper packaging company collects paper packaging waste from a retailer. Closed loop supply chain 300, as supported by a paper packaging company, provides materials and services for recycled paper making 301, converting operations 305, product packing operations 309, and retailer waste collection operations 313.

Commoditization, and the challenges it creates, promises to be with the industry for the foreseeable future. To thrive in this environment, paper packaging companies will need to find new ways to strengthen profits—and today, a key opportunity is emerging in the packaging supply chain. Research and experience indicate that as the retail industry moves toward a more stream-lined, end-to-end approach to managing this supply chain, packaging companies are in a position to fill many of the gaps in that chain. By doing so, they can be critical enablers of a "closed-loop" packaging materials supply chain that encompasses paper packaging companies, consumer goods and retail products manufacturers, and retail distribution companies (see FIG. 3).

To take advantage of this opportunity, packaging companies will need to rethink their traditional focus on core competencies, and instead broaden their role in the supply chain. Packaging companies need to expand their offerings and become not simply a supplier of traditional packaging products and solutions, but rather a provider of multiple services in waste collection, transportation, materials procurement and product fulfillment. Packaging companies can become a partner of choice that helps customers meet their own business challenges. Indeed, this approach promises to be a win for both the packaging company and its customers.

With this broader role, packaging companies will be able to move beyond their traditional emphasis on increasingly commoditized products and reenergize margins and profits. Estimates suggest that in many consumer products, food and beverage, and retail products supply chains, the potential value at stake with the offering of new services is 15 to 30 percent of total manufacturers' product costs. Beyond additional revenues, packaging companies are also likely to benefit from stronger customer relationships and from the increased stability of playing a vital and valued role in the closed-loop supply chain.

Overall, this expanded position in supply chain 300 can be an important element in a packaging company's quest to become a high-performance business—that is, one that consistently outperforms its peers in revenue, profit growth and total return to shareholders, across business cycles. In the packaging industry, that kind of company will be free of the downward spiral of commodity pricing and diminishing margins, and positioned for long-term success.

For many paper packaging companies, one of the first types of service to consider for expansion is waste collection 315. Associated services provide renewed opportunities in part because technology has made the separation of fiber and contaminants more cost-effective. At the same time, retail and consumer goods companies' waste disposal is under increased scrutiny in the United States, Europe and other markets, and the costs associated with disposal are escalating, especially for landfill usage, which is no longer even available in some areas. As a result, manufacturers now need "cradle to grave" solutions for disposal—a need that can be met by packaging companies that provide a chain of custody throughout the closed-loop supply chain, ultimately resulting in end-use fiber reclamation and consumption.

Eventually, packaging companies with a validated custody chain may also be able to take advantage of financial instruments (e.g., the UK's Packaging Recovery Notes (PRNs)) that enable trade in recovery and recycling credits. Strong markets for such instruments have yet to emerge, but even today the ability to provide validated waste disposal is likely to help packaging companies differentiate themselves in the eyes of their customers.

Figure 4:
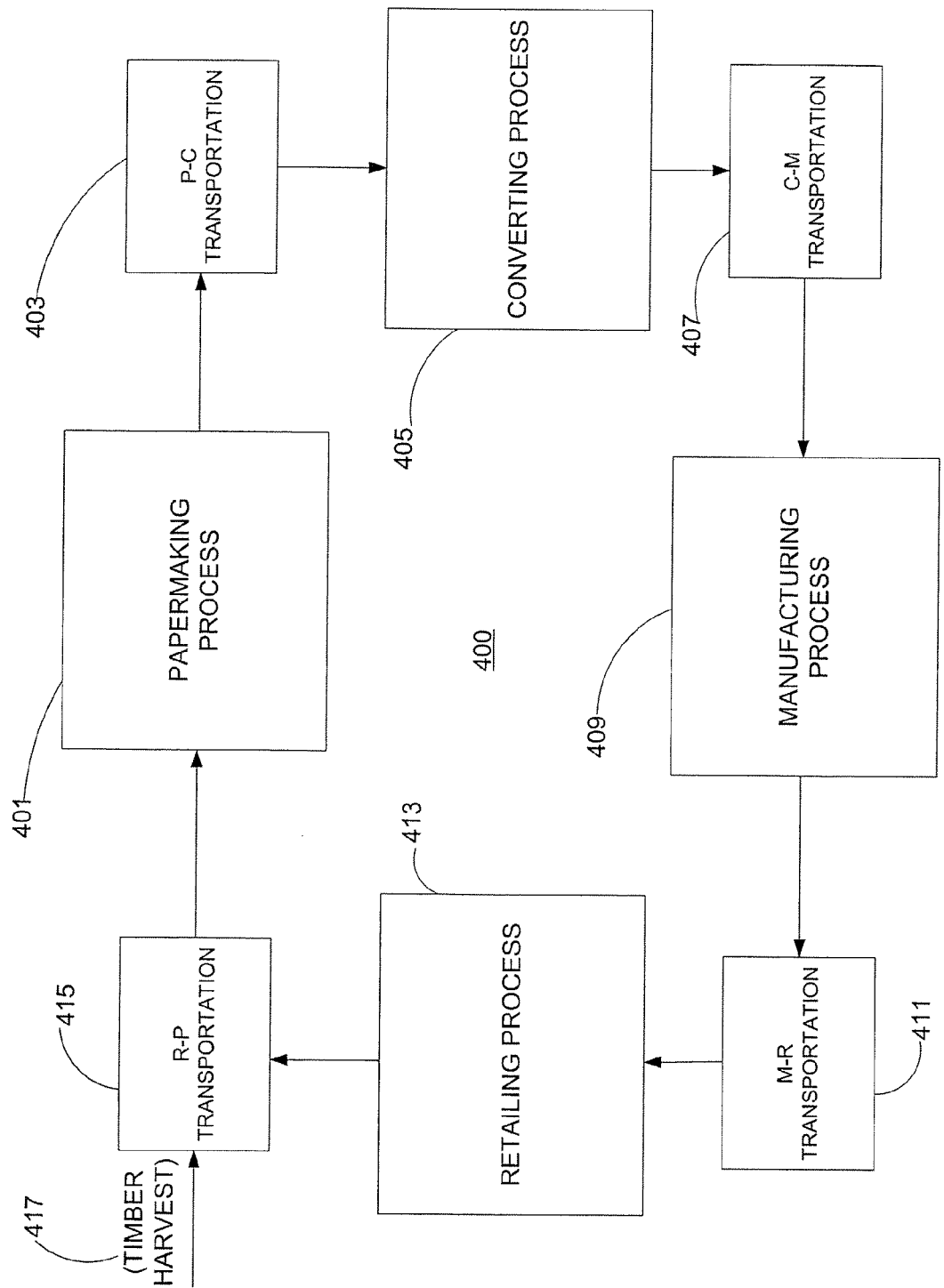
FIG. 4 shows a closed loop supply chain process in accordance with an embodiment of the invention.

FIG. 4 shows closed loop supply chain process 400 that is supported by a paper packaging company in accordance with an embodiment of the invention. Closed loop supply chain 400 comprises paper making process 401, converting process 405, manufacturing process 409, and retailing process 413, and transportation processes (legs) 415, 403, 407, and 411.

Papermaking process 401 produces paper material (which also may be referred to herein as "first paper material") from paper packaging waste (which also may be referred to herein as "first paper packaging waste") and from timber harvest 417. Converting process 405 converts the paper material into packaging material. With manufacturing process 409, a paper packaging company provides the packaging material to a product manufacturing company and assists the product manufacturing company in packaging a manufactured product. With retailing process 413, the paper packaging company collects paper packaging waste (which also may be referred to herein as "second paper packaging waste" to distinguish from the above) from a retailer. As shown in FIG. 4, closed loop supply chain 400 passes from retailing process 413 back to papermaking process 401 to produce paper material (which may be referred to as "second paper material" to distinguish from the "first" paper material produced in the prior pass through the loop).

Paper packaging companies may already manage three of the four transport "legs" in the industry delivery chain: handling the movement of goods from mill to converter (corresponding to P-C transportation process 403), from converter to product manufacturer (corresponding to C-M transportation process 407), and from retailer to mill (corresponding to R-P transportation process 415). An embodiment of the invention also includes a "manufacturer to retailer" leg (corresponding to M-R transportation process 411) by building on the transportation systems of a paper packaging company to provide integrated network management and backhaul optimization services. Research suggests that integrated paper and packaging transportation systems may deliver as much as 7 to 11 percent in total cost of transportation savings, which is a benefit that would be attractive to many product manufacturers and retailers.

Figure 5:
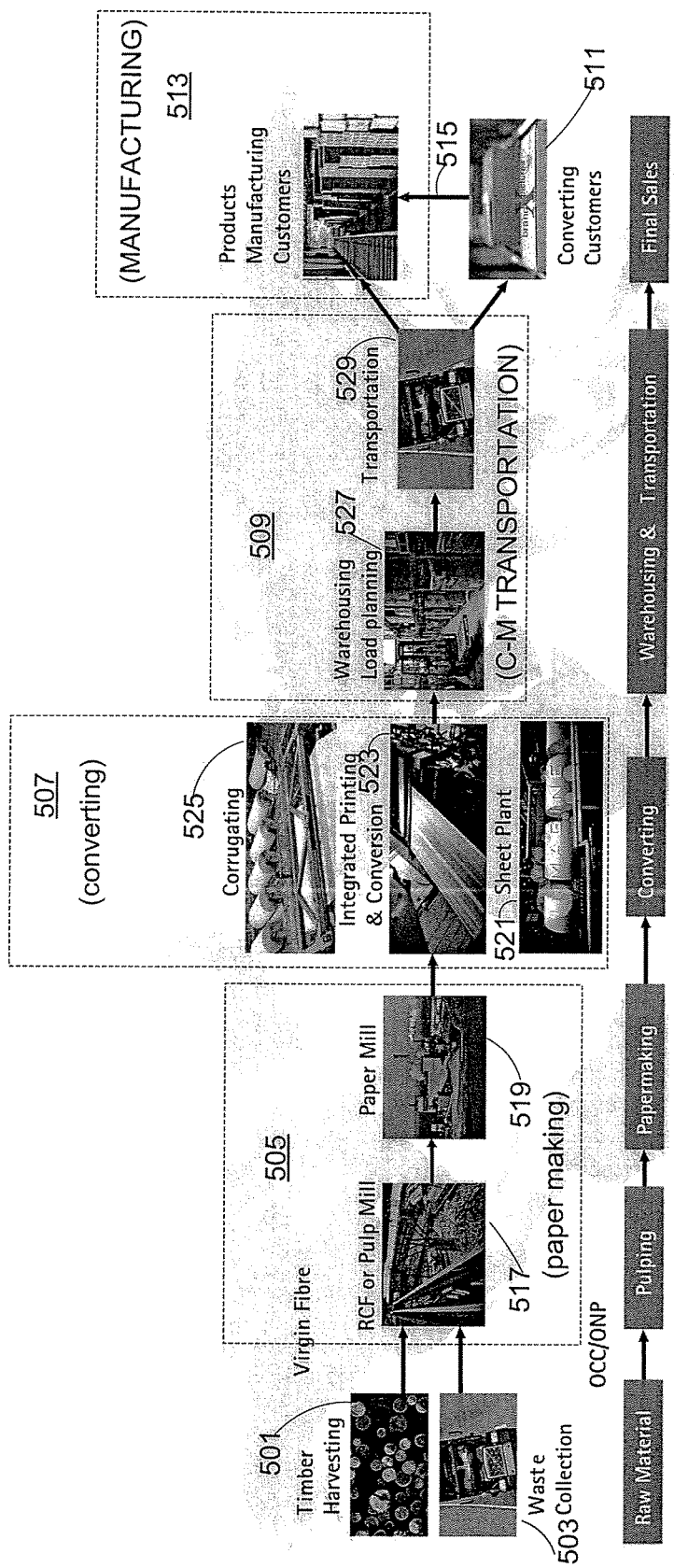
FIG. 5 shows a portion of a closed loop supply chain in accordance with an embodiment of the invention.

FIG. 5 shows a supply chain portion 500 of closed loop supply chain 400 in accordance with an embodiment of the invention. Supply chain portion 500 supports obtaining raw material, pulping and papermaking from the raw material, converting paper into packaging material, warehousing and transportation, and support of final sales, corresponding to timber harvesting process 501 and waste collection process 503, to papermaking process 505, converting process 507, transportation process 509, and manufacturing process 513, respectively. Papermaking process 505 further includes Recycled Fiber Collection Facility (RCF) 517 and paper mill 519. Converting process 507 includes sheeting plant 521, integrated printing and conversion 523, and corrugation 525. Transportation process 509 includes warehousing and planning 527 and transporting 529.

The paper packaging sector often has expertise and leverage in many secondary materials-procurement activities that are often regarded as a burden by product manufacturing companies' purchasing teams. Both material supply and organizational savings can be generated with managed procurement in areas such as adhesives, pallets, stretch wrap and banding material. In many cases, this can be extended to the entire product-fulfillment area, including warehouse and transportation procurement.

Packaging companies have traditionally invested in the internal development of packaging design, technical services and engineering capabilities. These capabilities may be more fully leveraged into the actual fulfillment and packaging operations of downstream customers as part of manufacturing process 513.

As companies continue to move toward more sophisticated Vendor Managed Inventory (VMI) processes, paper packagers are in position to take on the role of logistics, warehousing and inventory managers across the entire raw material/incoming goods space on behalf of the customer in order to support process 509. In such collaborative relationships, the packaging provider's services free up the customer to focus its resources and management attention on core differentiating activities, such as product development, marketing and innovation.

Figure 6:
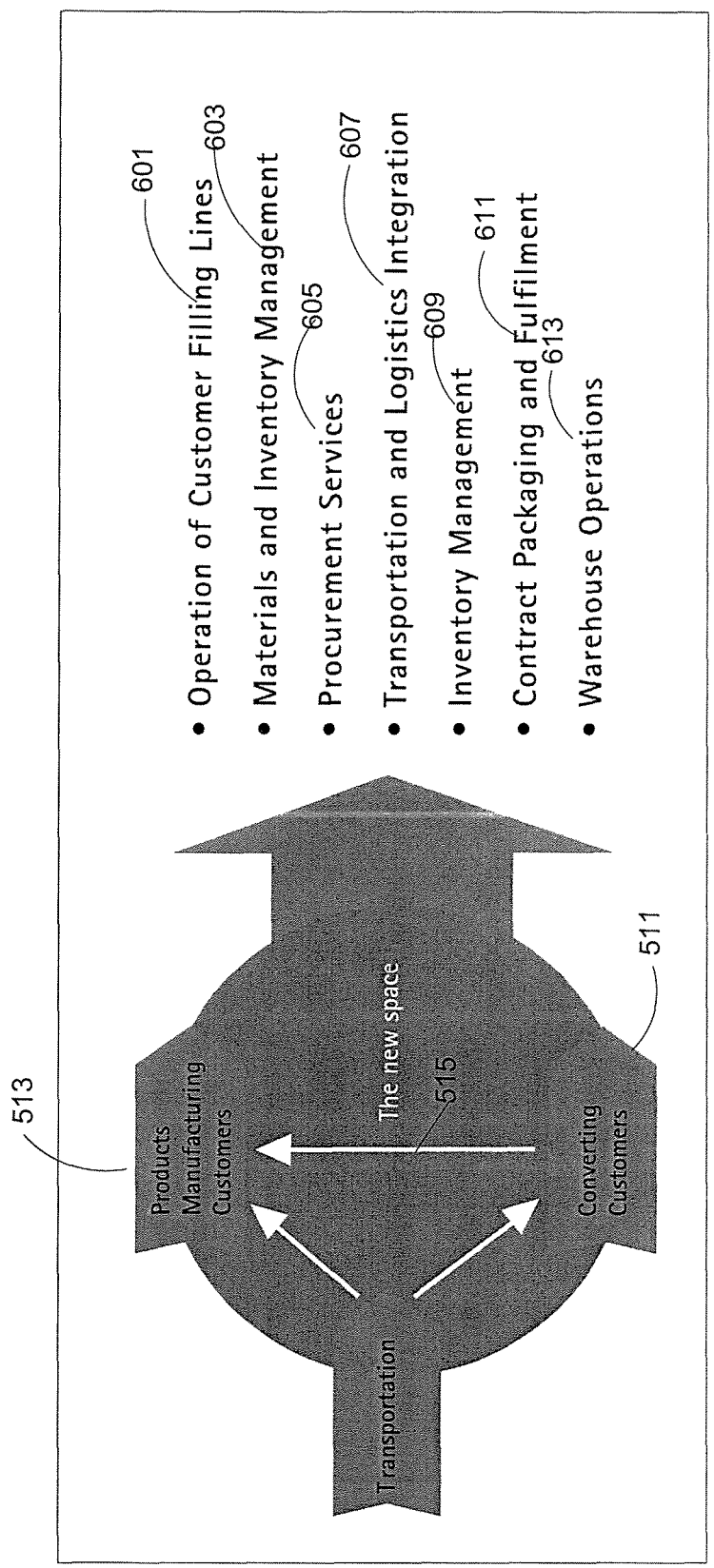
FIG. 6 shows a manufacturing process of a closed loop supply chain in accordance with an embodiment of the invention.

FIG. 6 shows a manufacturing process of a closed loop supply chain in accordance with an embodiment of the invention. Packaging disposal and recovery is, of course, just one opportunity that companies can exploit. They should also consider building on their current core competencies to provide a number of "input" services, e.g., inventory management 603 and 609, logistics 607, warehousing 613, procurement 605, and "output" services, e.g., the operation of customer packaging lines 601 and contract packaging and fulfillment 611. These services may be expanded across the supply chain as shown in FIG. 6.

In accordance with an embodiment of the invention, a paper packaging company may extend its offerings to meet the evolving requirements of a broad range of downstream customers, and ultimately make itself an integrated, closed-loop supplier of choice. In turn, that may help the paper packaging company move forward in the journey to becoming a high-performance business, and positioning itself for sustained success in the industry.

The opportunity is real, but it may not last forever. Business, like nature, abhors a vacuum, and if packaging companies cannot expand into new areas, the current gaps in the supply chain may soon be filled by others—a trend that is already under way. With that in mind, the willingness to begin exploring the possibilities of new, value-added services today—and to move beyond the traditional mind-set about such services—may well be a key success factor in a packaging company's pursuit of both growth and profitability.

Figure 7:
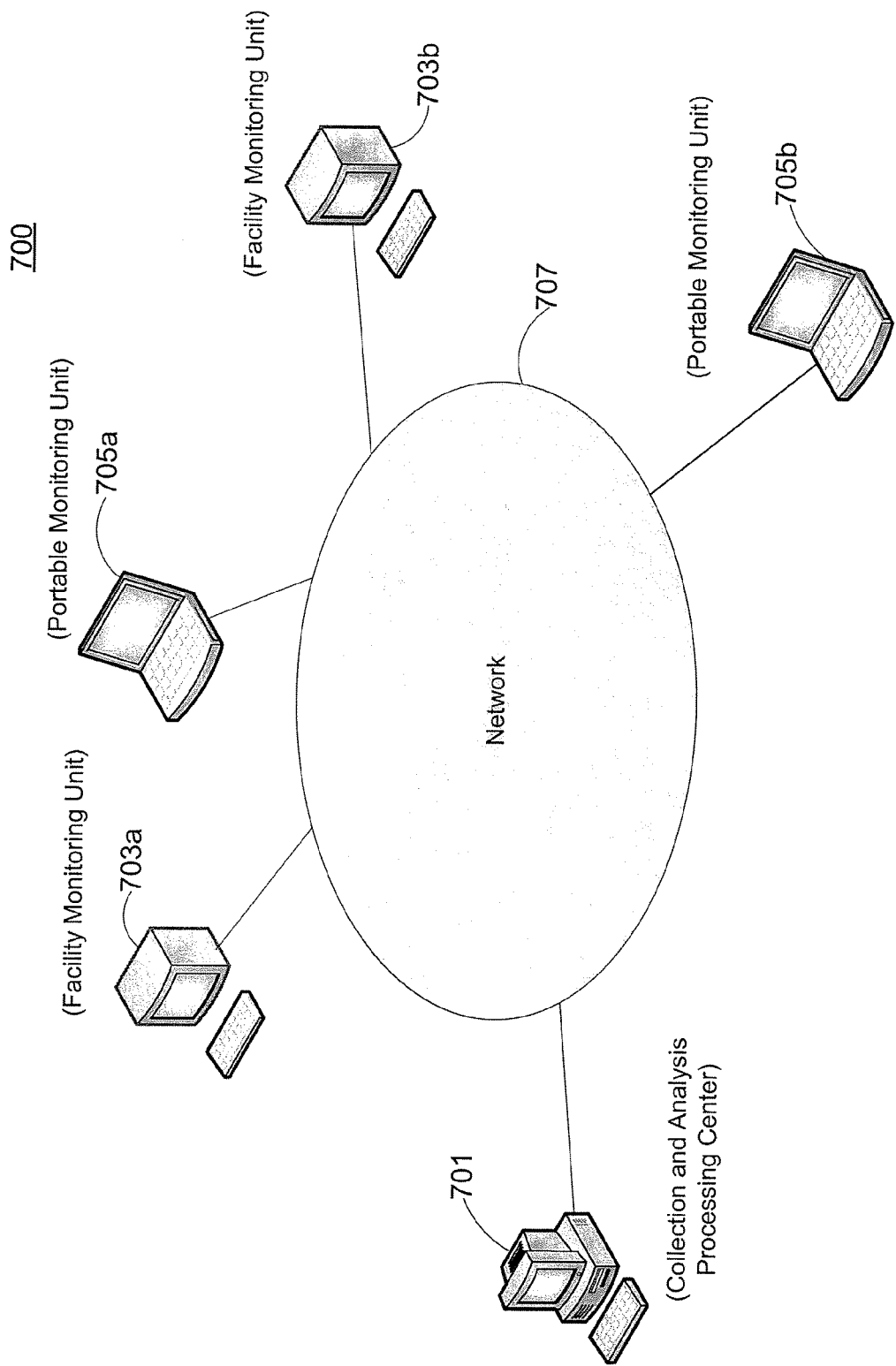
FIG. 7 shows a monitoring system for tracking and tracing material in a closed loop supply chain in accordance with an embodiment of the invention.

FIG. 7 shows monitoring system 700 that supports a closed loop system application with a real time "24/7" availability for tracking and tracing material in a closed loop supply chain (e.g., closed loop supply chain 300 as shown in FIG. 3) in accordance with an embodiment of the invention. Monitoring system 700 may also access measurements that quantize the environmental exposure of the paper packaging-related material as the paper packaging-related material traverses the closed loop supply chain. Environmental factors include temperature, humidity/moisture, and vibration.

Monitoring system 700 comprises collection and analyzer center 701 that communicates with facility monitoring units 703a and 703b and portable monitoring units 705a and 705b through network 707. Facility monitoring units 703a and 703b collect monitoring information about material as the paper-packaging-related material traverses closed loop supply chain 300 at different supply chain facilities, e.g., Recycled Fiber Collection Facility (RCF) 517, paper mill 519, and warehouse 527. (A facility is a construction that is associated with a process in a closed loop supply chain.) Similarly, portable monitoring units 705a and 705b collect monitoring information about paper packaging-related material at portable locations within closed loop supply chain 300 while the paper packaging-related material is being transported between facilities at portable locations, e.g., between mill to converter (corresponding to P-C transportation process 403) and between converter to product manufacturer (corresponding to C-M transportation process 407). Because facility monitoring units 703a and 703b are located at facilities while portable monitoring units 705a and 705b are not permanently situated, facility monitoring units 703a and 703b are typically more comprehensive in monitoring material. For example, the weight of the paper packaging-related material (timber, paper, or packaging product) may be weighted at a permanent facility (e.g., converting facility 305 as shown in FIG. 3) but not at a temporary truck stop along a highway as paper packaging-related material is transported.

Monitoring system 700 comprises collection and analyzer center 701, facility monitoring units 703a and 703b, and portable monitoring units 705a and 705b. Monitoring units 703, 703b, 705a, and 705b and collection and analyzer center 701 communicate through network 707 and are typically based on a computer platform (e.g., computer 100 as shown in FIG. 2). As paper packaging-related material traverses closed loop supply chain 300, monitoring system 700 tracks the paper packaging-related material. As paper packaging-related material moves through closed loop supply chain 300, the paper packaging-related material may be transformed from a first paper packaging material to a second paper packaging material, e.g., from timber and paper packaging waste to paper material and from paper material to packaging material. Also, the first packaging material may be transported through a segment of the closed loop supply chain without transformation, e.g., shipping packaging material from converting operation 305 to product packing operation 309 with transportation process 307 over an interstate highway.

Collection and analyzer center 701 collects data (e.g., material identification and environmental measurements) to track and trace paper packaging material in closed loop supply chain 300. For example, a user can locate a shipment of packaging material in closed loop supply chain 300 by entering the identification the material. Also, collection and analyzer center 701 can determine the amount of first paper packaging material (e.g., paper material) entering a facility (e.g., converting facility 305) and the amount of second paper packaging material (e.g., packaging material) leaving the facility. Consequently, collection and analyzer center 701 can analyze the collected data to determine the operational efficiency of closed loop supply chain 300. For example, collection and analyzer center 701 can determine loss of paper packaging material in closed loop supply chain 300, the manufacturing efficiency of a facility (e.g., the ratio of material leaving divided by material entering), damage to material, and the transport time of materials.

Figure 8:
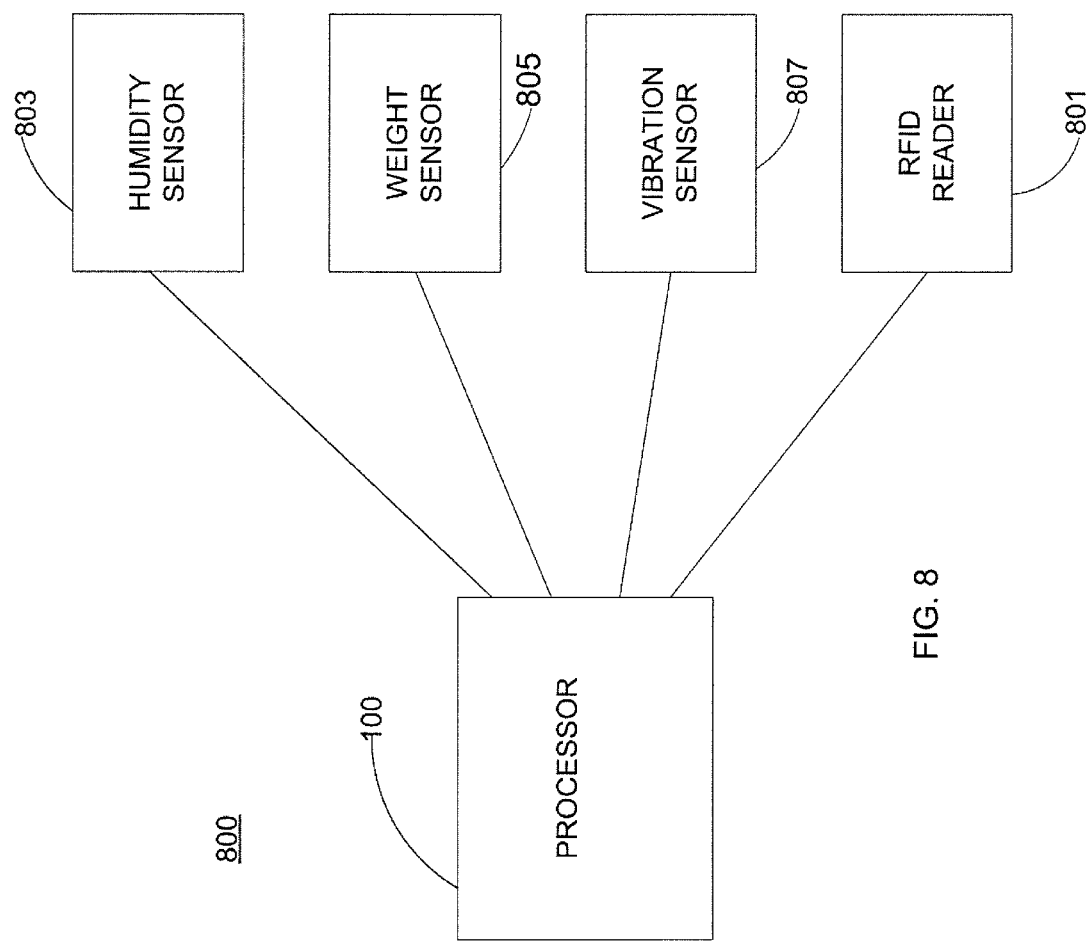
FIG. 8 shows an architecture of a monitoring unit in accordance with an embodiment of the invention.

FIG. 8 shows an architecture of monitoring unit 800 (e.g., facility monitoring units 703a and 703b, and portable monitoring units 705a and 705b) in accordance with an embodiment of the invention. Monitoring unit 800 includes a processor 100 (as shown in FIG. 2) that communicates with network 707 through network interface 150 or universal serial bus (USB) interface 132. Monitoring unit 800 obtains an identification of the paper packaging-related material through RFID reader 801, which receives a RF signal from an RFID tag that is attached to the paper packaging-related material. Monitoring unit 800 measures measurements that quantize the environmental exposure of the material (e.g., timber, paper pulp, paper, packaging material, and packaging waste). For example, sensor 803 measures humidity and sensor 807 measures vibration. Monitoring unit 800 may also include weight sensor 805 to measure the weight of a shipment of material, e.g., timber or paper packaging waste. Monitoring unit 800 may also include timestamps to indicate the date and time that the data was obtained.

With an embodiment of the invention, measurements (e.g., humidity and vibration) may be recorded by a portable apparatus that is attached to the materials while the material is transported in the closed loop supply chain. When the material arrives at a facility, the apparatus may be connected to monitoring unit 800 so that processor 100 can obtain the measurements and send the measurements to collection and analyzer center 701.

With embodiments of the invention, both active and passive indicator tag systems may utilize Radio Frequency Identification (RFID) technology capability to enhance the level of detail and precision available within the closed loop supply chain. In accordance with an embodiment of the invention, a RFID track and trace tagging application may be incorporated into monitoring system using proprietary interfaces that may be custom built for each user application. The proprietary interfaces may be created in software code formats compatible with the user's existing system formats such as Oracle, Java, Linux, free form code applications.

In order to determine the identification of paper packaging-related material, an RFID tag is attached to the material. Depending on the type of paper packaging-related material, a RFID tag can be attached to each member of a shipment (e.g., each roll of paper), one of the members of the shipment (e.g., one of the tree logs in a timber shipment), or attached to the shipping container itself (e.g., container holding paper packaging waste). Monitoring unit 800 interfaces to RFID reader 801 and sends the extracted identification of the material to collection and analyzer center 701.

As can be appreciated by one skilled in the art, a computer system with an associated computer-readable medium containing instructions for controlling the computer system may be utilized to implement the exemplary embodiments that are disclosed herein. The computer system may include at least one computer such as a microprocessor, a cluster of microprocessors, a mainframe, and networked workstations.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method for providing an end-to-end approach by a paper packaging company to manage a closed loop supply chain for paper packaging-related materials, the method comprising:

(a) collecting, by the paper packaging company, paper packaging waste from a retailer;
(b) converting, by the paper packaging company, paper material produced from the paper packaging waste collected from the retailer into packaging material;
(c) providing, by the paper packaging company, the packaging material to a product manufacturer that uses the packaging material to package a product, wherein the product and the packaging material are delivered to the retailer;
(d) collecting from the retailer, by the paper packaging company, paper packaging waste comprising the packaging material that was delivered to the retailer, wherein steps (a)-(d) comprise the closed loop supply chain and provide the end-to-end approach;
(e) receiving, by the paper packaging company, information that tracks the paper packaging-related materials at locations within the closed loop supply chain including at the paper packaging company and at the product manufacturer, the paper packaging-related materials comprising: (i) the paper packaging waste of steps (a) and (d), (ii) the paper material, and (iii) the packaging material, wherein the paper packaging-related materials are tracked at the locations in the closed loop supply chain using facility monitoring units and portable monitoring units that communicate over a network with a centralized monitoring system to provide the chain of custody;
(f) based on the information, validating a chain of custody throughout the end-to-end approach including at the paper packaging company and at the product manufacturer, determining an amount of packaging material lost in the closed loop supply chain, determining manufacturing efficiency of the product manufacturer, and determining transport time of the paper packaging-related materials in the closed loop supply chain;
(g) in response to the validating, the paper packaging company trading in recovery and recycling credits; and
(h) procuring, by the paper packaging company, secondary materials for the product manufacturer, the secondary materials comprising adhesives, pallets, stretch wrap, and banding material.

2. The method of claim 1, further comprising:
providing, by the paper packaging company, fulfillment and packaging operations to downstream customers of the product manufacturer; and
developing a packaging design from the packaging material for the product manufacturer.

3. The method of claim 1, further comprising:
managing an incoming good space to the product manufacturer, the good space including the packaging material.

4. The method of claim 1, further comprising:
separating a contaminant from the paper packaging waste comprising the packaging material from the retailer in step (d); and
transporting, by the paper packaging company, the paper packaging waste comprising the packaging material from the retailer in step (d).

5. The method of claim 1, further comprising:
receiving, by the paper packaging company, information that gauges an environmental factor on the packaging material, wherein the information that gauges an environmental factor on the packaging material includes a time stamp.

6. The method of claim 1, further comprising:
attaching, at the paper packaging company, a radio frequency identification tag to the packaging material.

7. The method of claim 1, further comprising:
receiving, at the paper packaging company, information indicating whether the packaging material is damaged.

* * * * *